Nov. 30, 1926.
V. S. FIRESTONE
TRUCK
Filed Dec. 21, 1925   2 Sheets-Sheet 1
1,609,017
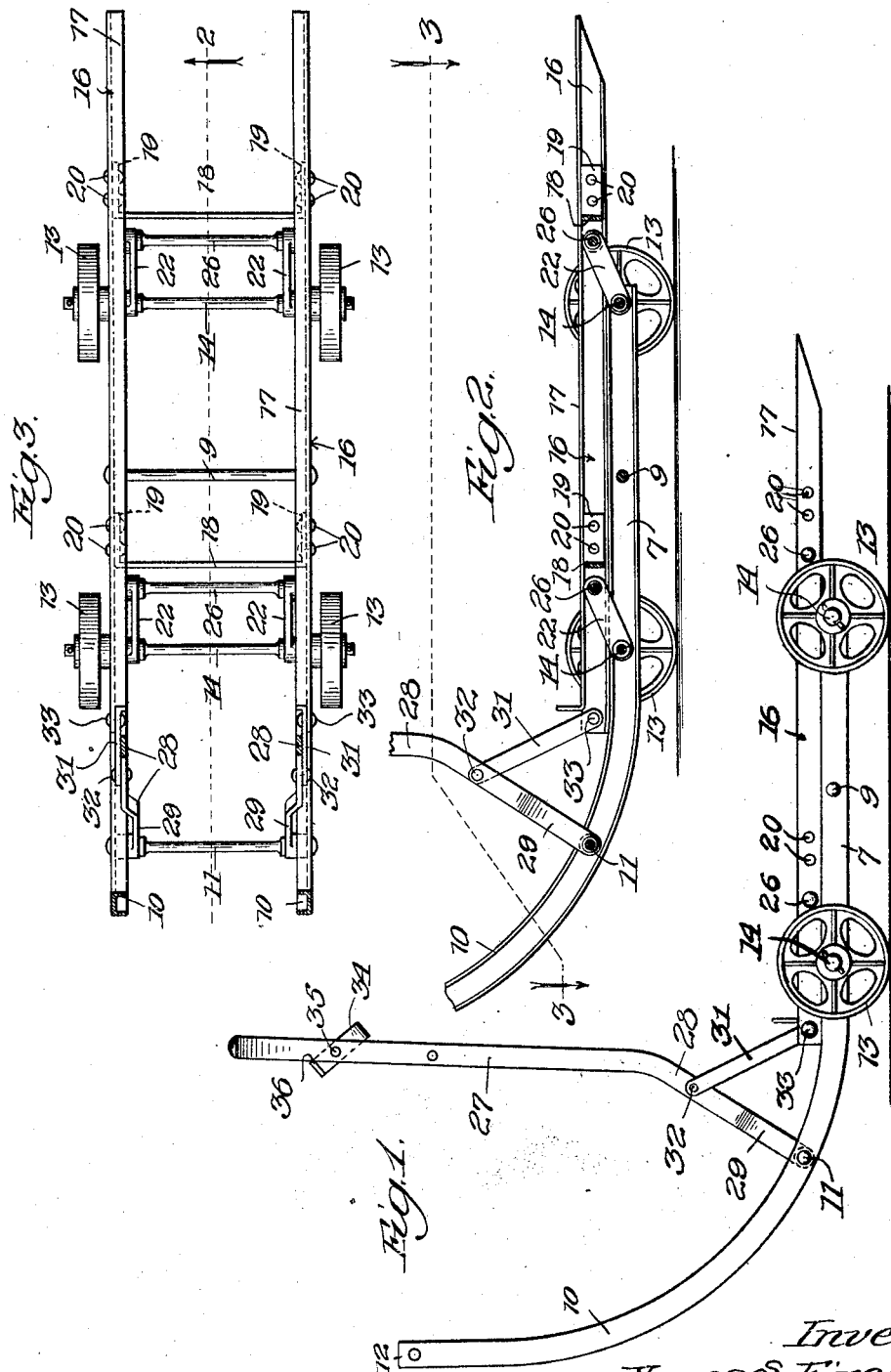
Inventor,
Vance S. Firestone

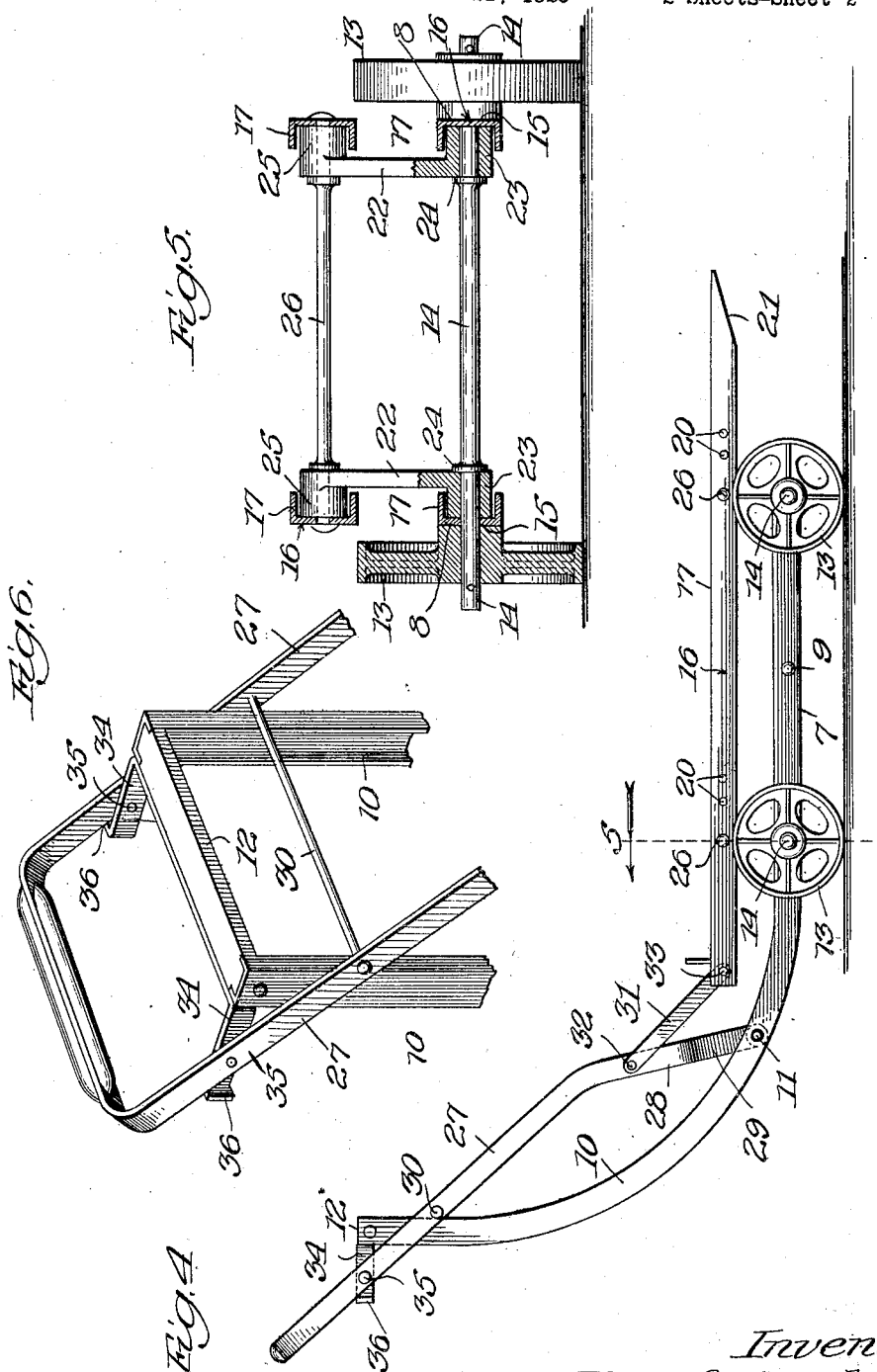

Patented Nov. 30, 1926.

1,609,017

UNITED STATES PATENT OFFICE.

VANCE S. FIRESTONE, OF FREEPORT, ILLINOIS, ASSIGNOR TO ARCADE MANUFACTURING COMPANY, OF FREEPORT, ILLINOIS, A CORPORATION OF ILLINOIS.

TRUCK.

Application filed December 21, 1925. Serial No. 76,669.

My invention relates to the type of truck which comprises an under-frame equipped with supporting wheels and having a handle rising therefrom at one end, and a platform supported on the under-frame to be movable up and down thereon through the medium of operating means connected with the under-frame, such a type of truck presenting great advantage in many situations as is well understood in the art.

My object generally stated is to provide improvements in trucks of the type referred to, to the end that the structure will operate the better to perform the function for which it is provided and extend its field of usefulness.

Certain of my more particular objects are to provide a rigid and stable form of construction adapting the truck to be used in connection with relatively heavy loads; to provide a construction adapted to be used in connection with relatively long articles, as for example bundles of metal bars the ends of which may project beyond the ends of the platform a relatively great distance in each direction without interfering with the operation of the truck; and to provide for the releasable locking of the platform moving means of the truck.

Referring to the accompanying drawings:—

Figure 1 is a view in side elevation showing the parts of the truck in the position they assume during the loading of the truck, namely, when the platform is in lowered position. Figure 2 is a longitudinal sectional view of the truck, the section being taken at the line 2 on Fig. 3 and viewed in the direction of the arrow. Figure 3 is a plan sectional view taken at the irregular line 3—3 on Fig. 2 and viewed in the direction of the arrows. Figure 4 is a view of the truck showing the position assumed by the various parts thereof when the platform is in raised, carrying, position. Figure 5 is an enlarged sectional view taken at the line 5 on Fig. 4 and viewed in the direction of the arrow; and Figure 6, a broken perspective view of the upper-end, handle, portion of the truck showing the parts in the positions represented in Fig. 4.

The under-frame of the truck represented at 7, is shown as formed of channel side members 8 connected together by a cross member 9, these side members 8 being extended upwardly at one end of the truck to present the curved upwardly extending portions 10 connected together in spaced relation toward their lower ends by the bar 11 and at their upper ends by a bar 12, the structure thus produced being of rigid frame-like form with its upwardly extending portion of general yoke shape and forming a handle portion through the medium of which the truck may be moved over the floor. The under-frame 7 is shown as supported on wheels 13 arranged in sets and shown as journalled on axles 14 extending through openings 15 in the side members 8.

The platform of the truck which may be of any desirable form, is represented at 16. In the particular construction illustrated the platform is formed of channel side members 17 connected together toward their opposite ends by cross bars 18 extending at their bent ends 19 into the channel portions of the members 17 and secured therein as by the rivets 20. This platform, the rear ends of the side members of which are beveled as represented at 21, is connected with the under-frame to be movable up and down thereon, through the medium of links 22 pivoted at their lower thickened ends 23 on the axles 14, between collars 24 thereon and the frame members 8, there being four of these links two on each axle 14. The upper thickened ends 25 of the links 22 extend into the channels of the members 17 and are pivotally connected therewith through the medium of pivoting rods 26, it being understood that the construction just described permits the platform to be moved from the position shown in Figs. 1 and 2 into the position shown in Fig. 4, and vice versa, as desired.

The means for controlling the position occupied by the platform 16 comprises, a yoke 27, the lower ends of the legs of which are bent as represented at 28 and inwardly deflected as represented at 29, the lower extremities of the legs of this yoke which extend between the channels 10, being pivotally connected with the latter at the cross-bar 11, adapting this yoke member to be rocked relative to the handle portion of the truck, the upper portions of the legs of this yoke being spaced apart a greater distance than the members 10 whereby the yoke may be swung to a position in which it straddles, at its upper end, the upper end of the handle portion of the truck, a cross-bar 30 connecting the legs of the yoke 27 together forming a stop bearing against the members 10. The yoke 27 is connected at its legs, with the platform 16, by means of links 31 pivotally connected, as indicated at 32, with the legs of the yoke 27, and as represented at 33, with the side members 17; it being understood that the parts are so constructed and arranged, as shown that in the swinging of the yoke from the position shown in Fig. 1, to the position shown in Figs. 4 and 6, the platform is raised from its lowermost position (Fig. 1) to its uppermost position in these last-referred-to figures.

The yoke member 27 when the platform 16 is in its uppermost position occupies the straddling position shown in Figs. 4 and 6, with its upper end projecting forwardly of the handle portion 10 and itself forming a handle portion through the medium of which the operator may, if he desires, move the truck over the floor.

I prefer to provide the truck with means for locking the platform 16 in raised position, these means preferably operating automatically to perform this function upon the act of raising the platform. The structure shown is provided with such a means comprising a yoke-shaped member 34 positioned between the legs of the yoke 27 and pivoted thereto as indicated at 35, the ends of the legs of the yoke 34 being outwardly bent as represented at 36 to form stops coacting with the legs of the yoke 27. The pivots 35 are so located that the cross-bar portion of the yoke 34 is heavier than the portion thereof at the other side of these pivots, whereby the tendency of the yoke 34 is to bear at all times at its lugs 36 against the underside of the yoke 27 as shown; and the yoke 34 is so positioned on the yoke 27 that when the latter is swung to the position shown in Figs. 4 and 6, in the raising of the platform 16, the yoke 34 will automatically drop down behind the upper end of the handle portion 10 and releasably lock the yoke 27 in platform-raised position.

It will be observed that by constructing the handle portion and platform-operating means, as shown, both of these elements extend upwardly from the truck to the desired position, without presenting obstruction to the piling of objects on the platform, as for example, metal bars of such a length and so positioned that they extend a considerable distance beyond both ends of the platform, this being made possible by reason of the open-work form of these elements.

Furthermore, the feature of providing the platform-operating mechanism with a yoke member 27, with its legs at opposite sides of the truck, is of advantage inasmuch as by connecting both legs of the yoke to the platform, stress on these operating parts is equally divided at opposite sides of the truck thereby minimizing wear at the connection of these operating parts, reducing the amount of power required for raising the platform and minimizing danger of cramping of the operating parts, especially where relatively heavy loads are applied to the platform 16.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. In a truck, the combination of an underframe having an upwardly extending handle portion, a platform on said underframe and movable up and down thereon, means for moving said platform on said underframe and comprising a portion extending upwardly along said handle portion, and means operating automatically to lock said first-named means in a position in which said platform is raised in the movement of said platform to raised position comprising a yoke pivoted on said first-named means and adapted to automatically drop into interlocked condition relative to said handle portion in the movement of said platform to raised position.

2. In a truck, the combination of an underframe having a yoke-shaped upwardly extending handle at one end, a platform on said underframe and movable up and down thereon, means for moving said platform comprising a yoke-shaped operating portion extending upwardly along said handle portion at opposite sides thereof and pivotally supported on said handle portion, the parts being so arranged that the truck is open at its handle portion to permit of the projection therethrough of objects placed on said platform without obstruction to the operation of said means, and means operating automatically to lock said first-named means in a position to which said platform is raised in the movement of said platform to raised position comprising a yoke-shaped locking member pivoted on the yoke-shaped part of said second-named means and adapted to automatically drop into interlocked condition relative to said handle in the movement of said platform to raised position.

VANCE S. FIRESTONE.